United States Patent [19]

Schroeder

[11] 4,445,700
[45] May 1, 1984

[54] HIGHWAY TRANSPORT TRUCK TIRE WATER SPLASH SHIELD

[76] Inventor: Warren C. Schroeder, 200 Cambridge Dr., Hagerstown, Md. 21740

[21] Appl. No.: 314,220

[22] Filed: Oct. 23, 1981

[51] Int. Cl.³ ............................................. B62D 25/16
[52] U.S. Cl. ............................................. 280/154.5 R
[58] Field of Search ........ 280/152 R, 153 R, 154.5 R, 280/156, 157; 296/1 S

[56] References Cited

U.S. PATENT DOCUMENTS

| | | | |
|---|---|---|---|
| 3,866,943 | 2/1975 | Innis | 280/154.5 R |
| 4,124,221 | 11/1978 | Goings | 280/154.5 R |
| 4,334,694 | 6/1982 | Iwanicki | 280/154.5 R |

FOREIGN PATENT DOCUMENTS

| | | | |
|---|---|---|---|
| 80735 | 3/1956 | Denmark | 280/154.5 R |
| 2524344 | 9/1976 | Fed. Rep. of Germany | 280/154.5 R |
| 188236 | 11/1922 | United Kingdom | 280/154.5 R |
| 1058892 | 2/1967 | United Kingdom | 280/154.5 R |

*Primary Examiner*—David M. Mitchell
*Assistant Examiner*—Timothy Roesch

[57] ABSTRACT

An assembly intended to reduce the water splash and throw from operating highway transport trucks in wet weather conditions by the installation of replaceable sectionalized wheel skirts that modify vacuum/suction/pressure conditions within and about the skirt.

17 Claims, 20 Drawing Figures

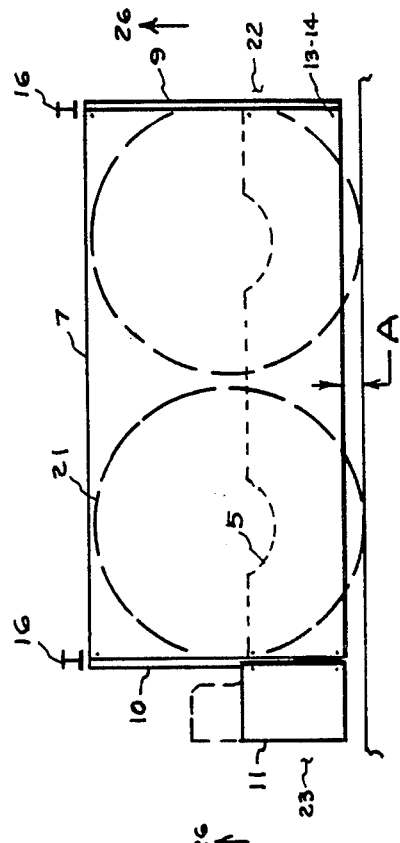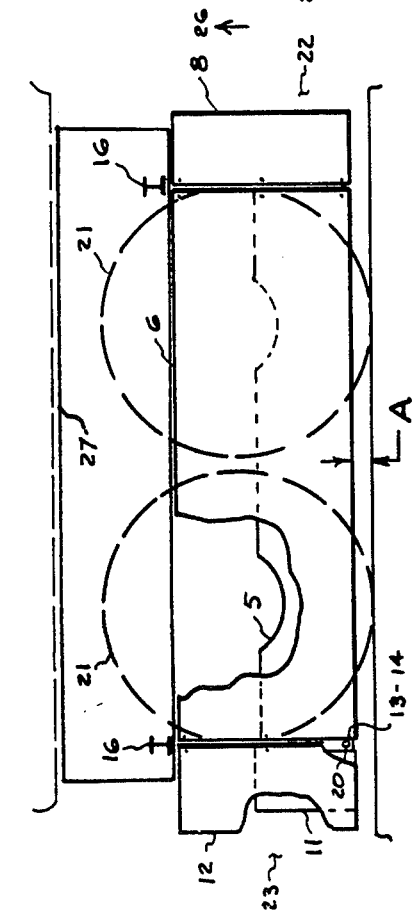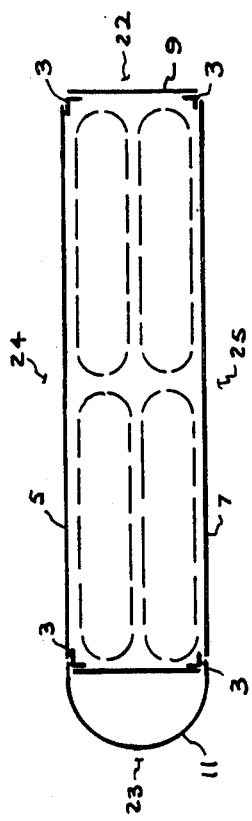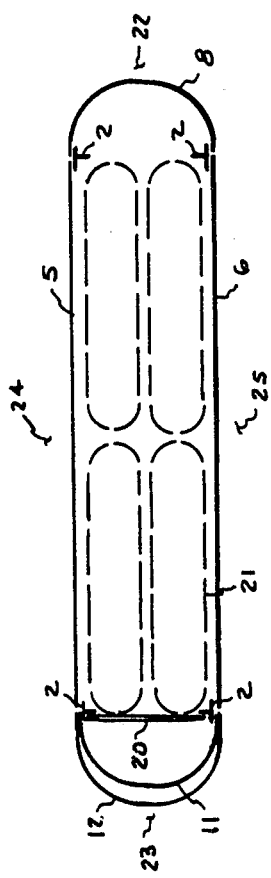

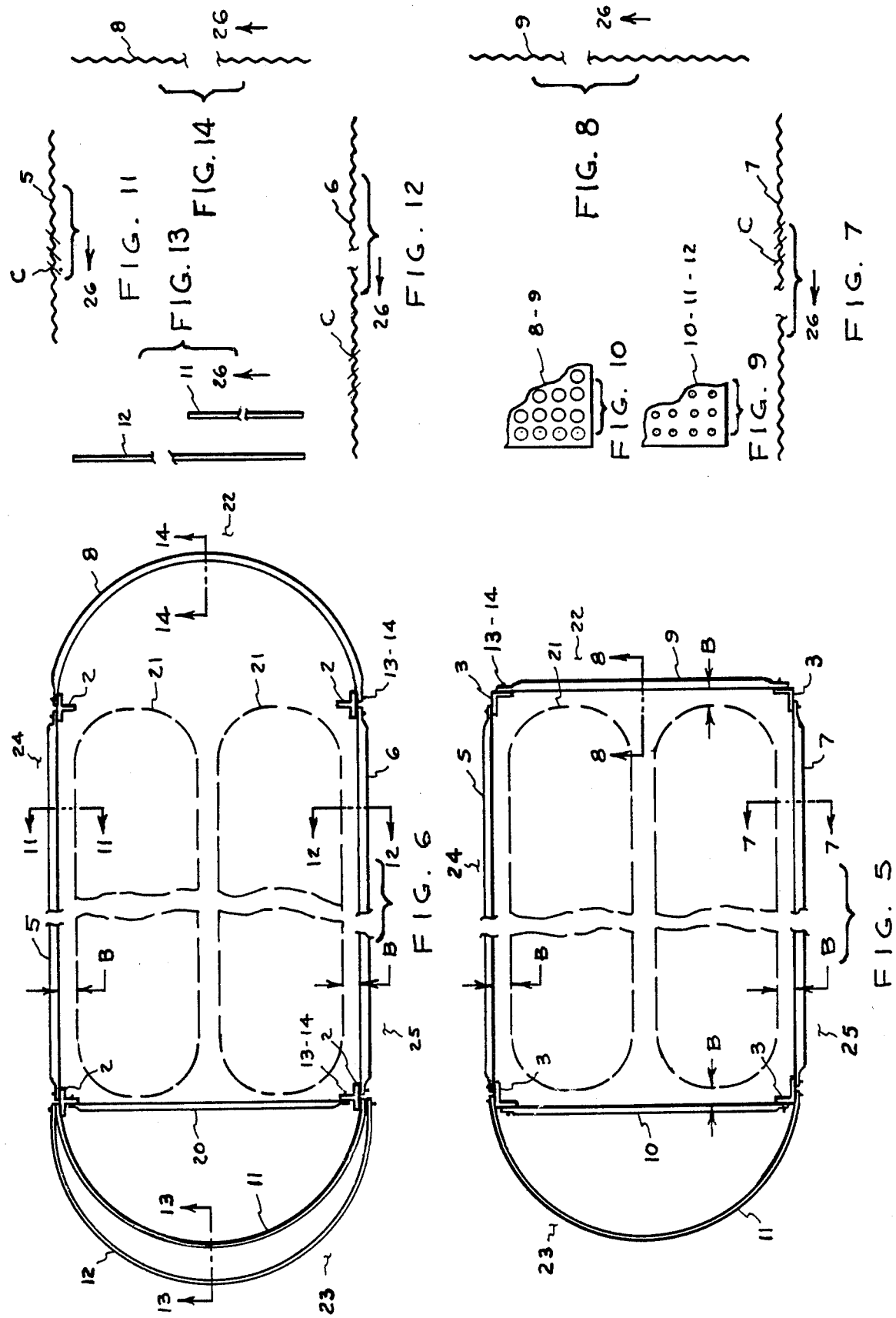

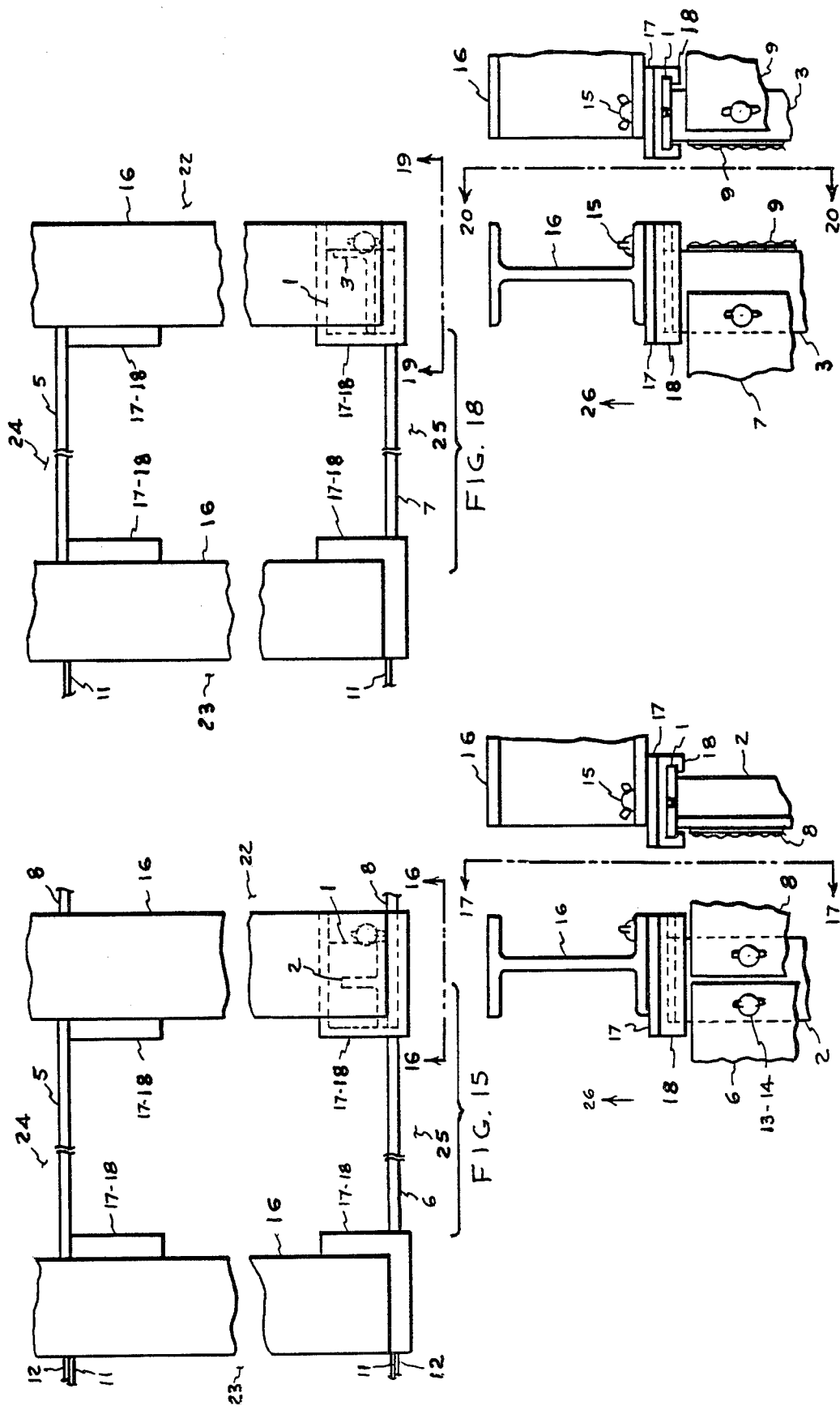

HIGHWAY TRANSPORT TRUCK TIRE WATER SPLASH SHIELD

BACKGROUND OF THE INVENTION

There are many existing patents on wheel splash shields and fender arrangements for vehicles. None of these patents, however, adequately protect the adjacent vehicle drivers from excessive water splash from transport trucks on major highways in a rain storm. Due to the tight design configuration of the running gear with the truck body and width an ordinary fender over the transport gear will not work. In addition the movement of the vehicle at high speeds creates a vacuum/suction condition that further hampers the control of the water splash.

SUMMARY OF THE INVENTION

This invention greatly reduces highway transport truck water splash on wet highway conditions. The splash shield design mounted over truck transport tires is such as to restrict splash and at the same time create an air vacuum/suction/pressure equalizing affect both reducing and controlling water movement and thereby improving driving visability for adjacent vehicles. An as an additional safety feature the shield reduces the danger of tire rim ring failures.

The SHIELDS are modular in design permitting them to be readily disassembled and/or assembled as conditions warrant which further permits a quick and economical unit replacement of damaged parts.

BRIEF DESCRIPTION OF THE DRAWINGS

FIG. 1 shows a side view of splash shields and transport wheels on a tandem axle where there is sufficient room both in front of and behind the transport wheels.

FIG. 2 shows a side view of splash shields and transport wheels on a tandem axle where clearance both in front of and behind the transport wheels are limited.

FIG. 3 shows a plan view arrangement of FIG. 1.

FIG. 4 shows a plan view arrangement of FIG. 2.

FIG. 5 shows a partial enlarged plan view of FIG. 2.

FIG. 6 shows a partial enlarged plan view of FIG. 1.

FIG. 7 shows a section cut through an outside panel of the splash shield of FIG. 5.

FIG. 8 shows a section cut through a front panel of the splash shield of FIG. 5.

FIG. 9 shows a partial piece of the material type used at the rear closures of the splash shields before fabricating.

FIG. 10 shows a partial piece of the material type used at the front closures of the splash shields before fabricating.

FIG. 11 shows a section cut through an inside panel of the splash shield of FIG. 6.

FIG. 12 shows a section cut through an outside panel of the splash shield of FIG. 6.

FIG. 13 shows a section cut through the rear panels of the splash shield of FIG. 6.

FIG. 14 shows a section cut through the front panel of the splash shield of FIG. 6.

FIG. 15 shows a partial plan view of the splash shield and upper structure as used in FIG. 1.

FIG. 16 shows a partial side view of FIG. 15 showing the corner post attachments.

FIG. 17 shows a partial front view of FIG. 16.

FIG. 18 shows a partial plan view of the splash shield and upper structure as used in FIG. 2.

FIG. 19 shows a partial side view of FIG. 18 showing the corner post attachments.

FIG. 20 shows a partial front view of FIG. 19.

DESCRIPTION OF THE PREFERRED EMBODIMENTS

Shown in FIGS. 1 thru 20 are the general and installation arrangements of a HIGHWAY TRANSPORT TRUCK TIRE WATER SPLASH SHIELD as used on the right side of an eighteen wheel transport truck. The front wheels and the left side wheels are not shown in the drawings. The left side wheels have the same shielding arrangement except they are opposite hand components. FIG. 1 shows the trailer portion. FIG. 2 shows the tractor portion of the rear tandem axles. Direction indicators are shown by reference 22, 23, 24, 25 and 26; 22 front, 23 rear, 24 inside, 25 outside and 26 up. Mobile transport unit tires are indicated by reference 21.

The HIGHWAY TRANSPORT TRUCK TIRE WATER SPLASH SHIELDS are made up of individual panels. FIG. 1 shows the embodiments of this invention as it skirts the tandem transport trailer wheels. The panel sections are front panel 8 and rear panel 12. Panel shield 11 is a secondary rear panel which acts as an airfoil damper reducing water throw and pickup. Corner posts 2 shown are "T" sections. These posts extend down from the auxiliary frames 16 added to the trailer unit and run the full distance of the side panels to form their support. The panels are secured through bores matching a plurality of captive studs 13 permanently installed in each of the corner posts. Wing nuts 14 installed on captive studs 13 secure the panel side independently to the corner posts. FIG. 6 is an enlarged plan view showing the panel contours and their independent installation with corresponding corner posts. FIG. 15 shows a partial plan view of the auxiliary frames 16. These frames are added permanently to both the tractor and trailer frame body (not shown). FIGS. 16 and 17 show the corner post and independent side panel attachments. A rectangular pad 1 is secured to the top of corner post 2. Support pad 17 is permanently secured to frame 16. A slotted mounting 18 mates with support pad 17 and is secured to it and journals with pad 1 securing it captive in five planes. A winged stud 15 threaded to journal with 18 and extending thru is located to secure pad 1 in its sixth plane. Clearance is provided in parts 16 and 17 for screw 15.

Space is generally very limited surrounding the rear tandum axle wheels of the tractor thus restrictive shields are required. FIG. 2 shows the embodiment of this invention as it skirts the tandum tractor wheels. The panel sections are outside panel 7, inside panel 5, front panel 9 and rear panels 10 and 11. Panels 9 and 10 are fabricated in straight sections. Panels 7 and 5 are made in straight sections. In order to accommodate straight panels, corner posts 3 have only angled cross sections instead of "T" cross sections. Mounting installation of auxiliary frames 16, shown in FIGS. 18, 19 and 20 are similar with posts of the "T" cross sections. Panels 5, 6, 7, 8, 9 and 10 are fabricated to attain a corrugated cross section for lightness and stability. The end sections interfacing with corner posts remain flat. Panels 5, 6 and 7 have holes perforated on the lower portion of each corrugation as shown by reference "C" in FIGS. 7, 11 and 12. Panels 8 and 9 are fabricated from flat perforated stock material as shown in FIG. 10. Panels 10, 11 and 12 are fabricated from flat perforated stock material as shown in FIG. 9. Parts 11 and 12 are made of light gauge flat spring steel material and are retained in flat pattern condition in order to remain flexible to prevent damage when struck from the rear to a limited degree.

The variation in hole sizes and location is a necessary aspect of the transport truck tire water splash shield for creating an aerodynamic airflow to balance out the vacuum/suction/pressure affect of the enclosure and reduce splash.

Cross rod 20 is added interconnecting corner posts at the bottom rear section to stabilize. It is journaled to the corner posts by matching bores with the captive studs in the corner posts and is secured by wing nuts 14.

Inside panels 5 are similar to the outside panels 6 and 7 excepting they are mounted only beneath the axles and their upper edge is contoured for axle clearance and rolled for stability.

The reference "A" dimension clearance shown in FIGS. 1 and 2 can successfully be operated in the order of four inches when loaded and the reference "B" dimension clearance shown in FIGS. 5 and 6 can successfully be operated in the order of three-fourth of an inch to one inch. A permanent closure or shield not shown, is added above the outside panel and the rear panel indicated by reference 27 on the drawings to prevent water escape above the enclosure.

The entire highway transport truck tire water splash shields shown are modular in design for accessability and economical component replacement. The entire unit may be assembled or disassembled in normal conditions without tools in approximately three to four minutes from the fixed supporting interface installation.

I claim:

1. A highway transport truck tire water splash shield for each group of two or more dual wheels of a transport tractor and each group of two or more dual wheels of a transport trailer connected to said tractor; said wheels mounted with pneumatic tire communicating with a road bed, said tractor and trailer each equipped with encompassing structures forming removable enclosures with holes introducing an airflow through, disrupting the encased enclosure atmosphere reducing wheel water throw and splash, which comprises a tractor enclosure including:
   (a) a straight front panel;
   (b) a straight outside panel;
   (c) a straight inside panel;
   (d) a straight upper rear panel;
   (e) a semi-circular rear panel;
   (f) a semi-circular secondary rear panel;
   (g) four independent corner posts with upper horizontal pads with a plurality of captive studs in said corner posts attached all said panels;
   (h) a rear lower cross bar interconnecting said corner posts;
   (i) a tractor frame mounted to the transport tractor which supports the tractor enclosure;
   (j) tractor frame support pads attached by a connecting means to said corner posts; and
   (k) a wing stud in each said tractor enclosure support pad and securing said corner post; and a trailer enclosure including:
   (l) a semi-circular front panel;
   (m) a straight outside panel;
   (n) a straight inside panel;
   (o) a semi-circular rear panel;
   (p) a semi-circular lower secondary rear panel;
   (q) four independent corner posts and upper horizontal pads with a plurality of captive studs in said corner posts attaching all said trailer enclosure panels;
   (r) a rear lower cross bar interconnecting said corner posts;
   (s) a frame mounted to the transport trailer which supports each trailer encosure;
   (t) trailer frame support pads attached by a connecting means to said corner posts;
   (u) a wing stud in each said trailer enclosure support pad and securing said corner post.

2. A splash shield as defined in claim 1, wherein the connecting means of the trailer and tractor frame support pads comprises a captive journal in five planes for connecting each of the four independent corner post circumscribing each dual wheel group.

3. A splash shield as described in claim 1, wherein the front panel (9) on transport tractor is straight between corner posts and having a corrugated vertical cross section and of sufficient vertical width to substantially shield dual wheels.

4. A splash shield as described in claim 1, wherein the front panel (8) on the trailer forms a contoured surface between corner posts having a corrugated vertical cross section and of sufficient vertical width to substantially shield the front portion of the dual wheels.

5. A splash shield as described in claim 1, wherein the rear panel (10) on transport tractor is straight between corner posts having a corrugated vertical cross section and of sufficient vertical width to substantially shield the rear portion of the dual wheels.

6. A splash shield as described in claim 1, wherein the rear panels on the trailer are contoured between corner posts having a flat vertical cross section and of sufficient vertical width to substantially shield dual wheels.

7. A splash shield as described in claim 6, wherein the secondary rear panel (11) on both the transport tractor and trailer are contoured between corner posts and have a flat vertical cross section and whereby both the contour and the height is reduced.

8. A splash shield as described in claim 1, wherein the outside panels (6 and 7) are straight and extending between corner posts having a corrugated vertical cross section and of sufficient vertical width to substantially shield the side portion of tire set.

9. A splash shield as described in claim 1, wherein the inside panels (5) are straight and extending between corner posts and have a corrugated vertical cross section and of sufficient vertical width to mount beneath wheel axle.

10. A splash shield as described in claim 1, wherein the upper edge of the inside panel is contoured to provided axle clearance and a flange formed around the contoured edge for improved stability.

11. A splash shield according to claim 1, wherein the ends of said panels remain flat to interface with corner posts.

12. A splash shield according to claim 1 both inside and outside panels of the trailer and tractor enclosures contain a plurality of holes for air passage.

13. A splash shield according to claim 1, wherein front and rear panels contain perforated holes for air passage.

14. A splash shield according to the claim 1, wherein each panel is independently mountable and dismountable to corner posts.

15. A splash shield according to claim 1, wherein end panels are independently mountable and dismountable to corner posts as a group or independently.

16. Rear panels of claim 6 whereby they are fabricated of flexible materials.

17. Rear panels of claim 7, whereby they are fabricated of flexible materials.

* * * * *